United States Patent [19]

Bartling et al.

[11] Patent Number: 4,565,071
[45] Date of Patent: Jan. 21, 1986

[54] METHOD AND APPARATUS FOR PROVIDING HEATING OR COOLING FOR A VEHICLE

[75] Inventors: Jerry W. Bartling, Boulder; James F. Hofstetter, Westminster, both of Colo.

[73] Assignee: Timpte Industries, Denver, Colo.

[21] Appl. No.: 582,959

[22] Filed: Feb. 23, 1984

[51] Int. Cl.⁴ ............................................. F25D 17/06
[52] U.S. Cl. ........................................ 62/89; 98/31; 62/239; 62/405
[58] Field of Search .................... 62/426, 455, 239, 89, 62/407, 405; 98/31, 33 A, 6, 8

[56] References Cited

U.S. PATENT DOCUMENTS

| | | |
|---|---|---|
| 522,448 | 7/1894 | Canda . |
| 1,030,671 | 6/1912 | Mason . |
| 1,264,899 | 5/1918 | Clark ......................................... 98/6 |
| 2,159,406 | 5/1939 | Schwebs .................................... 62/19 |
| 2,165,580 | 7/1939 | Scheufler ................................ 74/13 |
| 2,780,923 | 4/1957 | Jones ................................. 62/426 X |
| 3,092,220 | 6/1963 | Black ....................................... 189/34 |
| 3,224,500 | 12/1965 | Bennett ................................. 165/53 |
| 3,246,592 | 4/1966 | Rath ........................................ 98/31 |
| 3,786,652 | 1/1974 | Bolynn .................................... 62/243 |
| 4,143,588 | 3/1979 | Exler ........................................ 98/6 |
| 4,310,192 | 1/1982 | Fitzgerald ......................... 62/239 X |

Primary Examiner—William E. Wayner
Attorney, Agent, or Firm—Sheridan, Ross & McIntosh

[57] ABSTRACT

In one embodiment of the invention, conditioning means for providing air at a desired temperature are located adjacent to the front end of a vehicle. The conditioning means have an inlet adjacent the top of the vehicle and an outlet adjacent the bottom. Conditioned air flows from the outlet through an imperforate passageway along the bottom of the vehicle to the rear end of the vehicle where the conditioned air moves vertically through a passageway in the rear door and is discharged adjacent the top of the vehicle. The discharged conditioned air flows in normal convection paths back to the inlet of said conditioning means. In another embodiment, the conditioning means are located adjacent to the bottom of the vehicle between the front and rear ends thereof.

16 Claims, 6 Drawing Figures

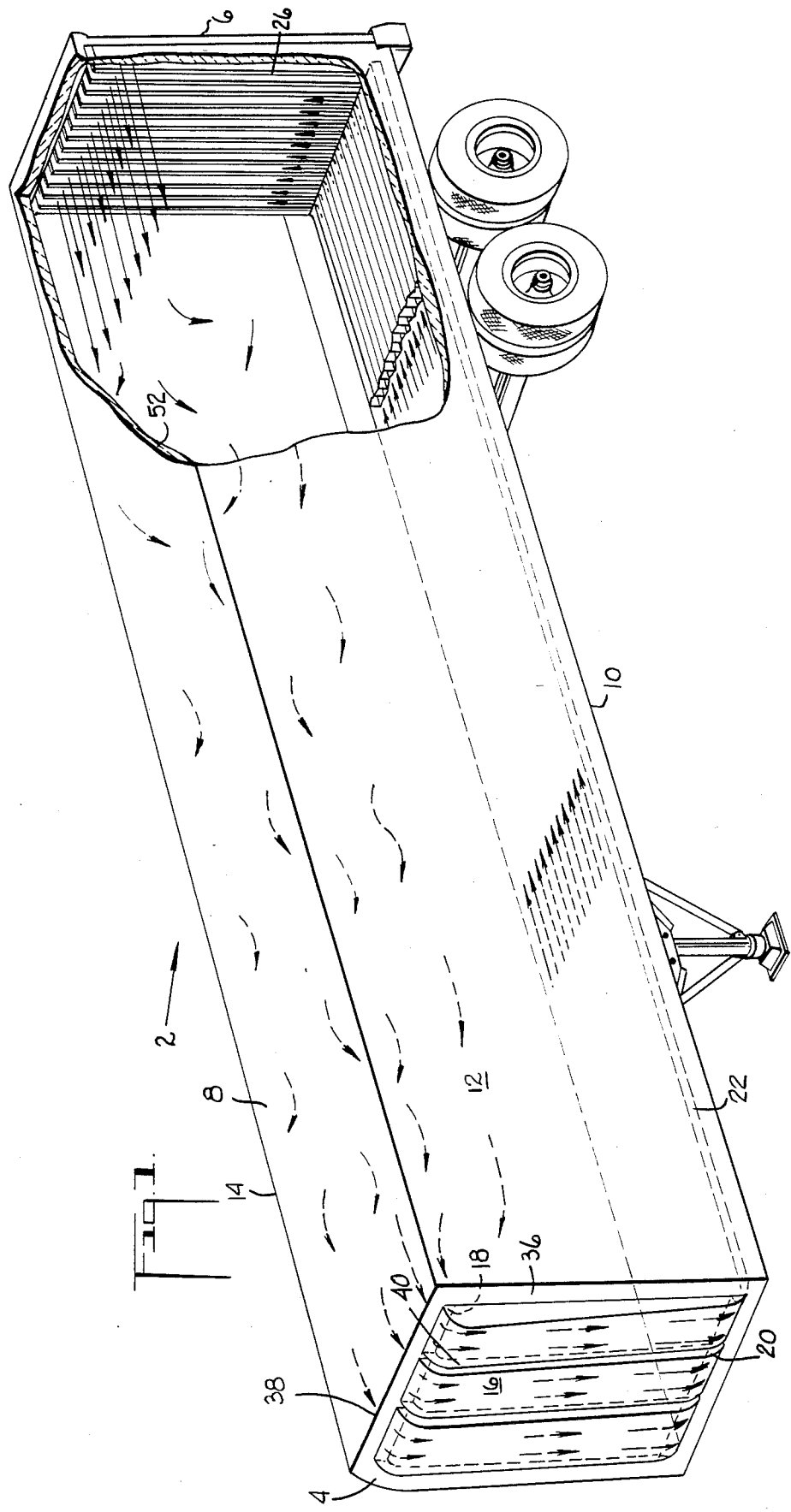

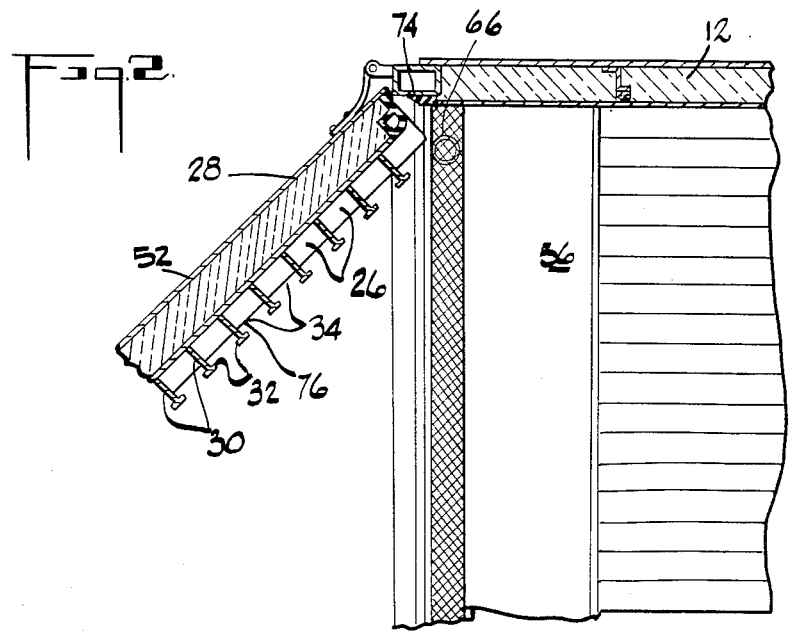
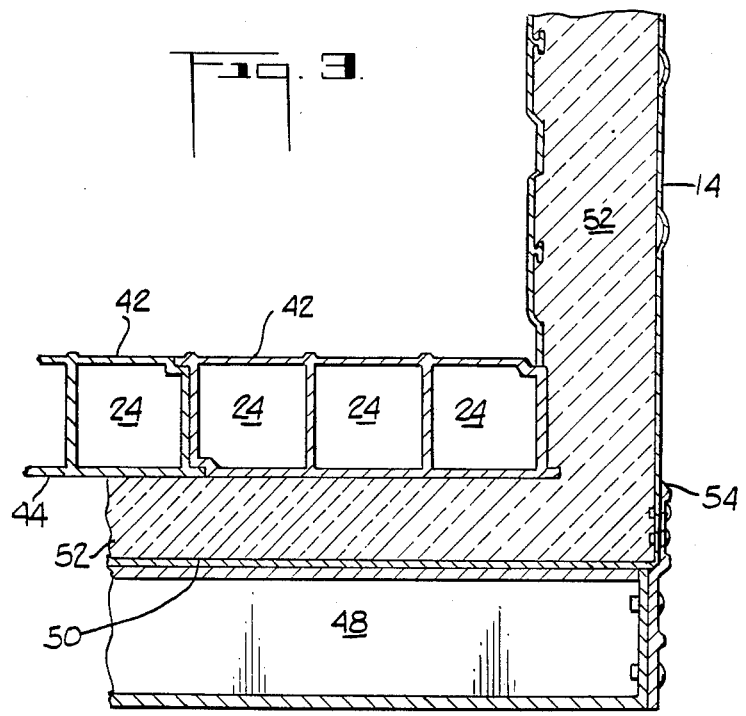

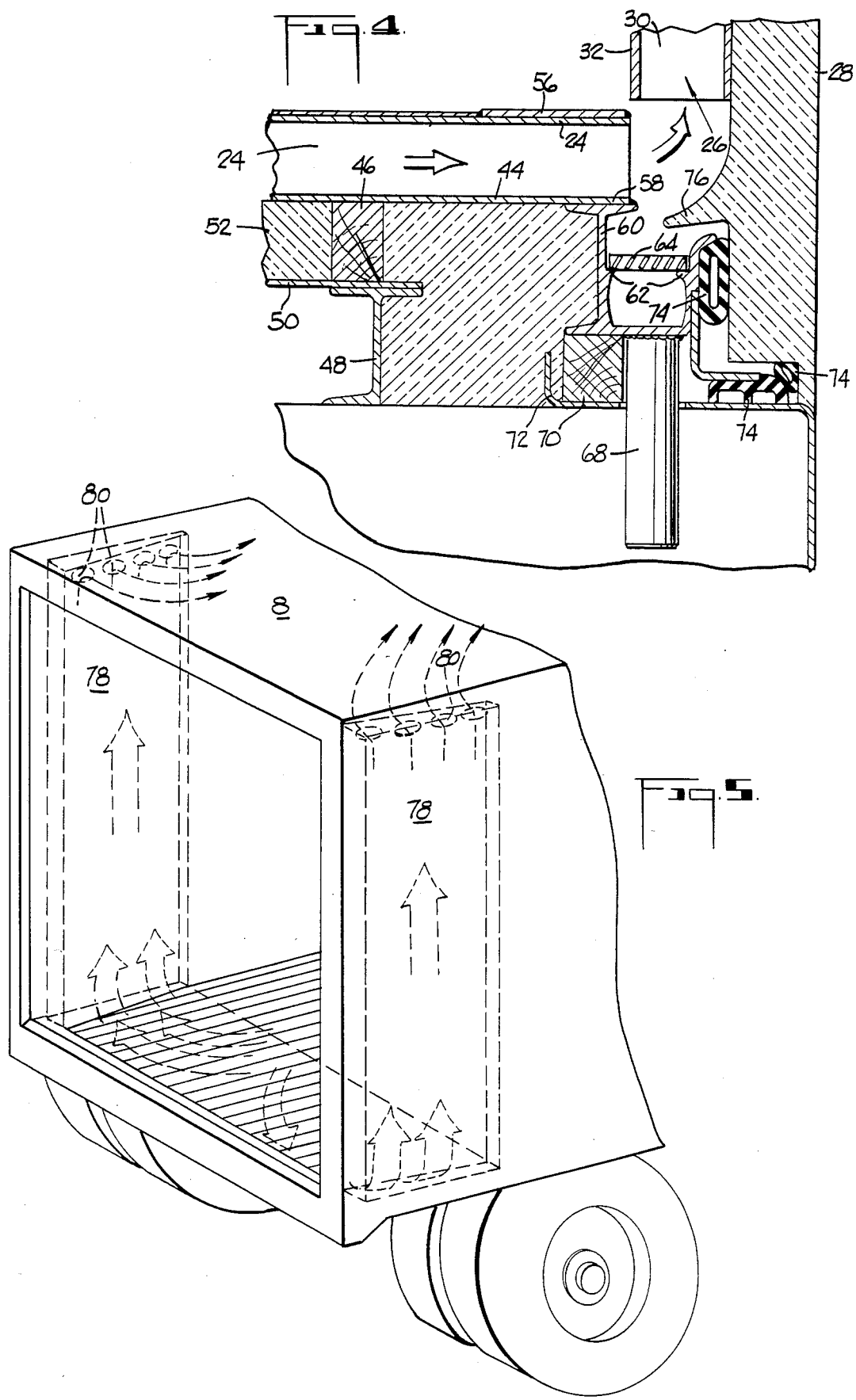

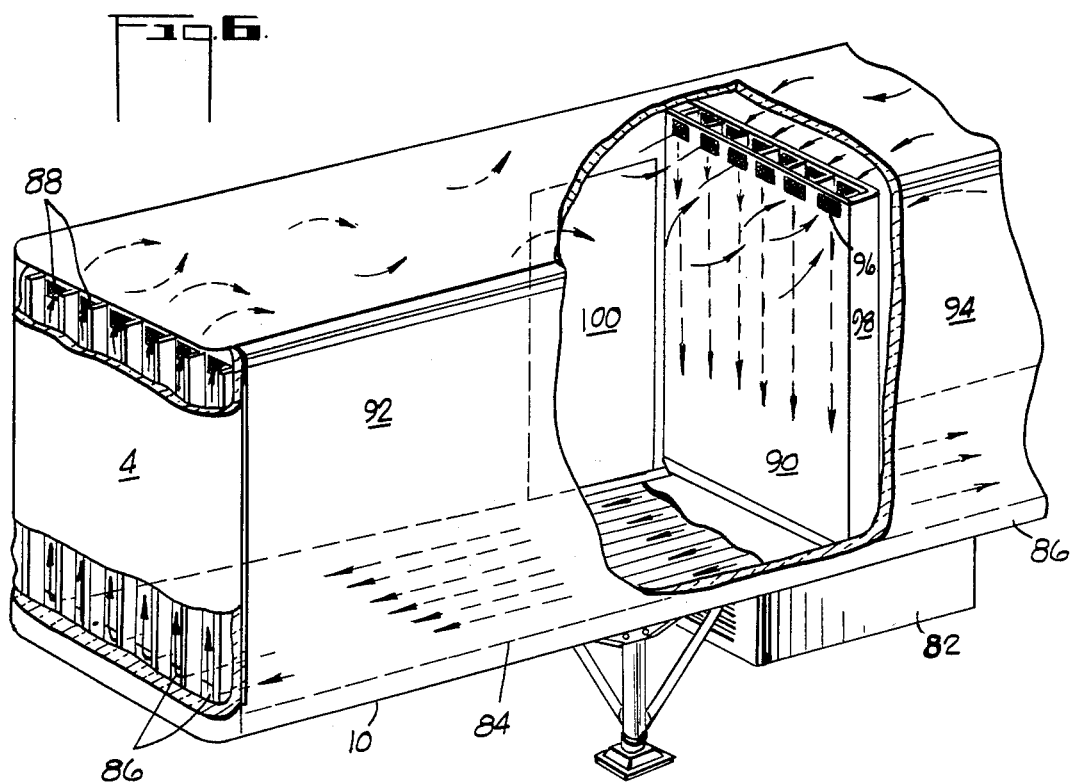

METHOD AND APPARATUS FOR PROVIDING HEATING OR COOLING FOR A VEHICLE

FIELD OF THE INVENTION

This invention relates to the transportation of perishable materials, such as food, and is particularly directed to method and apparatus for controlling the temperature within a vehicle engaged in such transportation by providing heated or cooled air.

BACKGROUND OF THE INVENTION

Over the years, many people have proposed untold numbers of ways for controlling temperature within a vehicle used in the transportation of perishable materials. The term, vehicle, as used herein includes truck semi-trailer, truck full trailer, truck van bodies, intermodal containers, railway car and other similar units. In the late nineteenth century and the early twentieth century, most of the effort was directed to railroad cars. However, with the advent of trucks and the improvement in highways, the major effort now is directed toward truck trailers and intermodal containers. Many of these patents disclose systems for controlling the flow of air in an effort to ensure that all the perishable material is kept at a temperature most desirable for the products being transported. In spite of all these efforts, there continues to exist the problem of keeping all of the perishable material at the desired temperature at all times during transportation especially in long distance hauls particularly when the ambient temperature is extremely hot or cold.

It is an object of this invention to provide method and apparatus for controlling the flow of temperature conditioned air through a vehicle carrying perishable material so that the perishable material is maintained at the desired temperature.

It is another object of this invention to provide temperature conditioned air to a vehicle wherein the conditioning means for providing the air at the desired temperature is mounted on the front side of the vehicle and such conditioning means is provided with air flow enhancement contours.

It is a further object of this invention to utilize both convection and conduction means to keep perishable materials in a vehicle at a desired temperature.

BRIEF SUMMARY OF THE INVENTION

The foregoing objects are accomplished in accordance with this invention by providing a vehicle wherein the conditioning means for providing air at the desired temperature, either hot or cold, are mounted on the vehicle at a desired location. The outlet of the conditioning means is located adjacent the bottom of the vehicle. Air at the desired temperature is discharged from the outlet of the conditioning means into a passageway extending from such conditioning means to an area adjacent at least one end of the vehicle. The conditioned air is then moved upwardly adjacent the one end of the trailer and discharged through openings located adjacent to the top of the vehicle. After passing out of these top openings, the conditioned air follows natural convection paths from the one end of the trailer toward the inlet means of conditioning means which inlet means is located adjacent to the top of the vehicle. In one embodiment of the invention, the conditioning means are located adjacent to the front end of the vehicle and the conditioned air moves to the rear end of the vehicle and then upwardly through a passageway located in the door of the vehicle. In another embodiment of the invention in this type of vehicle, the passageway for moving the conditioned air is located in each sidewall of the vehicle adjacent to the rear end. In still another embodiment conditioning means for providing air at the desired temperature are located below the bottom of the vehicle between the front and rear ends thereof and conditioned air is moved through passageways adjacent to the bottom of the vehicle and extending from the conditioning means to the front end and to the rear end of the vehicle. Means are then provided for the upward movement of the conditioned air adjacent to the front end and the rear end of the vehicle and out through openings adjacent to the top of the vehicle. The conditioned air follows natural convection paths to the inlet for the conditioning means which inlet means is adjacent the top of the vehicle. In this embodiment, inlet means are located in both sides of a partition dividing the vehicle into compartments wherein each compartment can be maintained at desired temperatures which may be different.

In the embodiment wherein the conditioning means is located adjacent to the front end of the vehicle, the actual location could be outside the body of the vehicle. If located in this manner, the outer surface of the conditioning means is provided with contours conducive to good air flow and thus reduce aerodynamic resistance and increase mileage per gallon.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The preferred embodiments illustrated in the drawing are truck trailers although, as stated above, the invention can be used with other types of vehicles. The drawings are not necessarily to scale, emphasis instead being placed upon illustrating the principles of the invention.

FIG. 1 is a pictorial view of a trailer constructed and operating in accordance with the principles of this invention;

FIG. 2 is a top plan view with parts in section illustrating a portion of the rear end of a trailer including a portion of a door;

FIG. 3 is a cross-sectional view of a portion of the sidewall and bottom of the trailer and illustrating the passageway adjacent the bottom of the trailer;

FIG. 4 is a cross-sectional view of a portion of the bottom and rear end of a trailer and illustrating the flow of air in this portion;

FIG. 5 is a pictorial view of a portion of a trailer illustrating another embodiment of the invention wherein the conditioned air moves vertically adjacent the rear end of the trailer through passageways in the sidewalls of the trailer; and FIG. 6 is a pictorial view of a portion of a trailer illustrating a further embodiment of the invention wherein the conditioning means is located below the bottom of the trailer and wherein the trailer is divided into two compartments.

Referring to the drawings and in particular to FIG. 1, there is illustrated generally at 2 a trailer of a truck having a front end 4, a rear end 6, a top 8, a bottom 10 and sidewalls 12 and 14. Adjacent to the front end 4, the trailer 2 is provided with conditioning means 16 for providing air at a desired temperature and which means 16 has an inlet 18 adjacent to the top 8 of the trailer and an outlet 20 adjacent to the bottom 10 of the trailer. The conditioning means will be conventional and usually will be provided with blower means to induce air from the interior of the trailer through the inlet 18 into the conditioning means and force conditioned air out of the conditioning means through the outlet 20. The outlet 20 leads to a passageway 22 adjacent to the bottom of the trailer which passageway extends from adjacent to the front end 4 to adjacent to the rear end 6 of the trailer 2. The outlet 20 is connected to the passageway 22 by suitable means (not shown) to ensure that substantially all of the conditioned air moves into the passageway 22. As illustrated more specifically in FIG. 3, the passageway 22 is formed by a plurality of ducts 24. Adjacent to the rear end 6 of the trailer, the passageway 22 leads to another passageway 26 in the door 28 of the trailer 2. Only one door is illustrated, but in a trailer having two doors, each door would be constructed in a similar manner. As illustrated more specifically in FIG. 2, the passageway 26 comprises a plurality of spaced T-shaped sections 30 with the heads 32 of the T-shaped sections 30 facing the interior of the trailer when the door is closed. There exists a space 34 between adjacent T-shaped sections. When the door 28 of the trailer is closed, the perishable material will be adjacent to the heads 32 and therefore cover these spaces so that substantially all of the conditioned air will move from passageway 22 into passageway 26 and then upwardly toward the top 8 of the trailer as illustrated in FIG. 1. In some instances, there will be a space, as much as three feet, between the cargo and the heads 32 of the T-shaped sections 30. While some of the conditioned air may leak out through the spaces 34, a portion of the conditioned air will travel in the passageway 26. Since substantially all of the conditioned air leaving passageway 22 is deflected upwardly into passageway 26 by deflect member 76, described below, there is a tendency for the conditioned air to remain in the passageway 26. In this instance the passageway 26 would include the space between the cargo and the heads 32 in addition to the passageway 26. It naturally follows that the wider the heads 32 are, the smaller the opening to the space 34 will be and the more conditioned air will flow through passageway 26 to be discharged therefrom adjacent to the top of the trailer. Also, the closer the cargo is positioned to the heads 32; the greater the quantity of conditioned air that will move to the top of the trailer. If desired to insure that substantially all of the conditioned air will exit the passageway 26 adjacent to the top of the trailer, the heads 32 could be joined together to form an imperforate wall which could be provided with openings adjacent to the top of the door, such as illustrated for the sidewall in FIG. 5. The conditioned air will pass through the spaces 34 over the top of the perishable material adjacent to the top 8 of the trailer and move in a direction toward the front end 4 of the trailer 2. As illustrated in FIG. 1, the conditioned air is moving from the rear end 6 toward the front end 4 and flows in natural convection paths until it reaches the inlet 18 of the conditioning means 16. It is noted in FIG. 1, that the conditioning means 16 is mounted on the outside surface 36 of the trailer 2 so that the inlet 18 and outlet 20 are really openings extending through the front wall 38 of the trailer 2. The conditioning means 16 is contoured as at 40 to provide less resistance to aerodynamic air flow over the outside of the trailer.

As illustrated in FIGS. 3 and 4, the ducts 24 are formed in sections of a plurality of ducts, illustrated as three ducts but not limited thereto, so as to form an upper surface 42 facing the interior of the trailer 2 and on which the perishable material is placed. The lower surface 44 of the ducts 24 rests on thermal barriers 46 which are supported on the tops of cross members 48. These barriers 46 may be formed from wood or other suitable material. The ducts 24 extend from adjacent the front end 4 of the trailer to adjacent the rear end 6. A panel 50 is secured to the top of the cross members 48 and the space between the lower surface 44 of the ducts 24 and the panel 50 is filled with insulating material 52, such as foamed polyurethane. It should be noted that each sidewall 12 and 14, each door 28, the front wall 38 and the top 8 are fully insulated with insulating material 52, such as foamed polyurethane. The cross members 48 are secured to support members 54 which extend for substantially the full length of the trailer.

The structure adjacent to the rear end of the trailer is illustrated in FIGS. 2 and 4. A support plate 56 is secured to the surface 42 of the ducts 24 so as to provide reinforcement for the loading plate at the dock. The ends 58 of the ducts 24 are supported on a member 60 which extends across substantially the full width of the trailer. The member 60 is provided with spaced projections 62 for supporting a screen plate 64. An opening 66 is provided in the member 60 and a drain pipe 68 is secured to the member 60. A thermal barrier 70 supports the member 60 and is mounted on the rear frame butt 72. Suitable seals 74 are used between adjacent portions of the door 28 and the trailer. A deflecting member 76 is mounted on the door 28 to ensure that substantially all of the conditioned air will move out of the ducts 24 into the passageway 26. As illustrated in FIG. 4, the ends of the ducts 24 are adjacent the heads 32 of the T-shaped sections 30.

In FIG. 5, there is illustrated another embodiment of the invention. Instead of moving the conditioned air through a passageway in the rear doors of the trailer, the conditioned air from the bottom of the trailer is directed to passageways 78 formed in the sidewalls 12 and 14 of the trailer. Openings 80 are provided adjacent to the top 8 of the trailer providing an outlet for the conditioned air.

Another embodiment of the invention is illustrated in FIG. 6. A conditioning means 82 is secured to the bottom 10 of the trailer. The conditioned air flows from the conditioning means 82 through the passageways 84 and 86 adjacent to the bottom of the trailer to the front 4 and rear 6 ends of the trailer. The front end 4 of the trailer is provided with a plurality of passageways 86 having openings 88 adjacent to the top 8 of the trailer for guiding the vertical movement of the conditioned air. The rear end 6 of the trailer is provided with structure similar to that in FIGS. 2 and 4. A partition 90 is provided and divides the trailer into two compartments 92 and 94. Openings 96 and passageways 98 are provided in the partition 90 to return spent air to the conditioning means 82. A door 100 is provided for entrance into compartment 92. This construction allows for transportation of different kinds of perishable materials wherein it is necessary to keep the perishable materials at different temperatures.

In operation, air from the trailer is drawn through inlet 18 into the conditioning means 16. The air moves from the conditioned means 16 through outlet 20 into passageway 22 and then flows toward the rear end 6 of the trailer. The flow of the conditioned air through the passageway 22 either raises or lowers the temperature of the surface 42 of the ducts 24 so that the perishable material in contact with the surface 42 is either heated or cooled and by convection raises or lowers the temperature in all areas adjacent thereto. The conditioned air then moves upwardly through the rear door 28 and by similar conduction and convection heats or cools the surrounding areas. The conditioned air emerges from the rear doors 28 adjacent to the top 8 of the trailer and flows in normal convection paths towards the front end 4 of the trailer. As the conditioned air moves from the rear end 6 to the front end 4, it heats or cools the surrounding areas to keep the perishable material at the desired temperature. The spent air then passes through inlet 18 to restart the process. The structure of FIG. 6 operates similarly except that the conditioned air flow is from the center to each end and then back to the center.

While the preferred embodiments of the invention have been described herein, the invention may be otherwise embodied and practiced within the scope of the following claims.

What is claimed is:

1. A method for providing heating or cooling for a vehicle comprising:
    providing the vehicle with conditioning means for providing air at a desired temperature, said means having an inlet and an outlet;
    providing means adjacent to the top of said vehicle and in fluid communication with said inlet and the interior of said vehicle;
    inducing substantially all of the air to be conditioned to flow through said means adjacent to the top of said vehicle into said inlet of said conditioning means from said interior of said vehicle;
    passing said air through said conditioning means to produce conditioned air;
    discharging substantially all of said conditioned air from said outlet of said conditioning means into a passageway adjacent to the bottom of said vehicle and extending from said outlet to a location adjacent to one end of said vehicle;
    forming a passageway in a door adjacent to said one end of said vehicle;
    flowing said substantially all of said conditioned air out of said passageway adjacent to said bottom of said vehicle and into said passageway formed in said door adjacent to said one end of said vehicle;
    flowing said conditioned air in a vertical direction through said passageway formed in said door adjacent to said one end of said vehicle and discharging said conditioned air in a location adjacent to said top of said vehicle; and
    inducing said discharged conditioned air located adjacent to said top of said vehicle to flow through normal convection paths from said one end of said vehicle to said inlet of said conditioning means.

2. A method as in claim 1 further comprising:
    making said passageway located adjacent to said bottom of said vehicle imperforate from said conditioning means to said door.

3. A method as in claim 1 and further comprising:
    providing means to ensure that substantially all of said conditioned air flows through said passageway adjacent to said one end of said vehicle; and
    discharging substantially all of said conditioned air from said passageway adjacent to said one end of said vehicle through openings adjacent to said top of said vehicle into said location adjacent to said top of said vehicle.

4. A method as in claim 3 and further comprising:
    locating said conditioning means outside the front end of said vehicle.

5. A method as in claim 4 and further comprising:
    providing said conditioning means located outside the front end of said vehicle with contours to enhance the aerodynamic properties thereof.

6. A method as in claim 3 and further comprising:
    locating said conditioning means between the front end and the rear end of said vehicle.

7. A method as in claim 6 and further comprising:
    locating said conditioning means outside said vehicle and below the bottom of said vehicle;
    providing a vertically extending fluid passageway having one end in fluid communication with said inlet of said conditioning means and the other end adjacent to the top of said vehicle in fluid communication with a front portion of said vehicle and also with a back portion of said vehicle;
    discharging conditioned air from said outlet of said conditioning means into passageways adjacent to the bottom of said vehicle and extending from said outlet to a location adjacent the front end of said vehicle and from said outlet to a location adjacent the rear end of said vehicle;
    flowing substantially all of said conditioned air into passageways adjacent to said front end and said rear end of said vehicle; flowing air therethrough in a vertical direction; and discharging said conditioned air therefrom through openings located adjacent to the top of said vehicle; and
    inducing said conditioned air discharged through said openings to follow normal convection paths from said front end and said rear end to said passageway in fluid communication with said inlet.

8. A method as in claim 3 and further comprising:
    locating said passageway adjacent to said one end of said vehicle in the sidewalls of said vehicle adjacent the rear end of said vehicle.

9. Apparatus for providing heating or cooling for a vehicle comprising:
    conditioning means associated with said vehicle for providing air at a desired temperature;
    said conditioning means having inlet means and outlet means and means for inducing a flow of substantially all of the air to be conditioned from the interior of said vehicle through said inlet means and for forcing conditioned air out of said conditioning means through said outlet means;
    means located adjacent to the top of said vehicle and in fluid communication with said inlet means and the interior of said vehicle and through which said substantially all of the air to be conditioned flows;
    means for providing a passageway located adjacent to the bottom of said vehicle and extending from said outlet of said conditioning means to an area adjacent to at least one end of said vehicle;
    means for discharging substantially all of said conditioned air from said outlet into said passageway adjacent to the bottom of said vehicle;
    means for providing a passageway adjacent to at least one end of said vehicle for the vertical flow of said conditioned air from said area, said means for providing for the vertical flow being mounted on a door of said vehicle and said means includes a plurality of T-shaped members having the stems of the T's attached to said door so that the heads of said T's face the interior of said vehicle;

means for discharging said substantially all of said conditioned air from said passageway located adjacent to the bottom of said vehicle into said passageway adjacent to said one end of said vehicle;

means for discharging said conditioned air from said means for providing a passageway for the vertical flow of said conditioned air at a location adjacent to the top of said vehicle; and means for inducing the flow of said discharged conditioned air through normal convection paths from said one end of said vehicle to said inlet of said conditioning means.

10. Apparatus as in claim 9 wherein:
said conditioning means are mounted on the exterior portion of the front end of said vehicle.

11. Apparatus as in claim 9 wherein:
said conditioning means are located on the exterior portion of said bottom of said vehicle between said front end and said back end of said vehicle and further comprises;

means extending in a vertical direction for dividing the interior of said vehicle into at least two compartments and said means having means defining a passageway extending from the top to the bottom thereof;

means adjacent to the top of said dividing means for providing fluid communication with each of said compartments;

means for providing fluid communication between said inlet means of said conditioning means and said bottom of said dividing means;

means for providing a plurality of imperforate ducts to provide passageways for said conditioned air located adjacent said bottom of said vehicle and extending from said outlet means of said conditioning means to the front end and to the rear end of said vehicle;

means for providing passageways for the vertical flow of said conditioned air adjacent to said front end and said rear end of said vehicle;

means for discharging said conditioned air from said means for providing passageways for the vertical flow of said conditioned air adjacent to the top of said vehicle.

12. Apparatus as in claim 11 and further comprising:
said means for providing for the vertical flow of said conditioned air comprises imperforate ducts having openings adjacent to said top of said vehicle.

13. Apparatus as in claim 12 wherein:
said passageway adjacent to said rear end is located in a door of said vehicle.

14. Apparatus as in claim 12 wherein:
said passageway adjacent to said rear end is located in at least one sidewall of said vehicle.

15. Apparatus as in claim 12 and further comprising:
a door in each of said compartments.

16. Apparatus for providing heating or cooling for a vehicle comprising:

conditioning means associated with said vehicle for providing air at a desired temperature, said conditioning means being located adjacent to the front end of said vehicle;

said conditioning means having inlet means and outlet means and means for inducing a flow of substantially all of the air to be conditioned from the interior of said vehicle through said inlet means and for forcing conditioned air out of said conditioning means through said outlet means;

means located adjacent to the top of said vehicle and in fluid communication with said inlet means and the interior of said vehicle and through which said substantially all of the air to be conditioned flows;

means for providing a passageway located adjacent to the bottom of said vehicle and extending from said outlet of said conditioning means to an area adjacent to at least one end of said vehicle;

means for discharging substantially all of said conditioned air from said outlet into said passageway adjacent to the bottom of said vehicle;

means for providing a passageway adjacent to said one end of said vehicle for the vertical flow of said conditioned air from said area, said means for providing a passageway for the vertical flow including means providing a plurality of imperforate ducts located in a door of said vehicle so that substantially all of said conditioned air will flow through said passageway for said vertical airflow, and further including means adjacent to the top of said ducts for providing a passageway for the flow of substantially all of said conditioned air from said ducts into the top of the interior of said vehicle adjacent to said one end;

means for discharging said conditioned air from said means for providing a passageway for the vertical flow of said conditioned air at a location adjacent to the top of said vehicle; and means for inducing the flow of said discharged conditioned air through normal convection paths from said one end of said vehicle to said inlet of said conditioning means.

* * * * *

UNITED STATES PATENT AND TRADEMARK OFFICE
CERTIFICATE OF CORRECTION

PATENT NO. : 4,565,071

DATED : January 21, 1986

INVENTOR(S) : Jerry W. Bartling and James F. Hofstetter

It is certified that error appears in the above—identified patent and that said Letters Patent is hereby corrected as shown below:

At column 6, line 6, delete "3" and substitute therefor --2--.

Signed and Sealed this

Twenty-seventh Day of May 1986

[SEAL]

Attest:

DONALD J. QUIGG

Attesting Officer

Commissioner of Patents and Trademarks